Jan. 12, 1932. K. ARNSTEIN ET AL 1,841,321
AIRCRAFT HANGAR AND METHOD OF BUILDING IT
Filed March 28, 1929 3 Sheets-Sheet 1
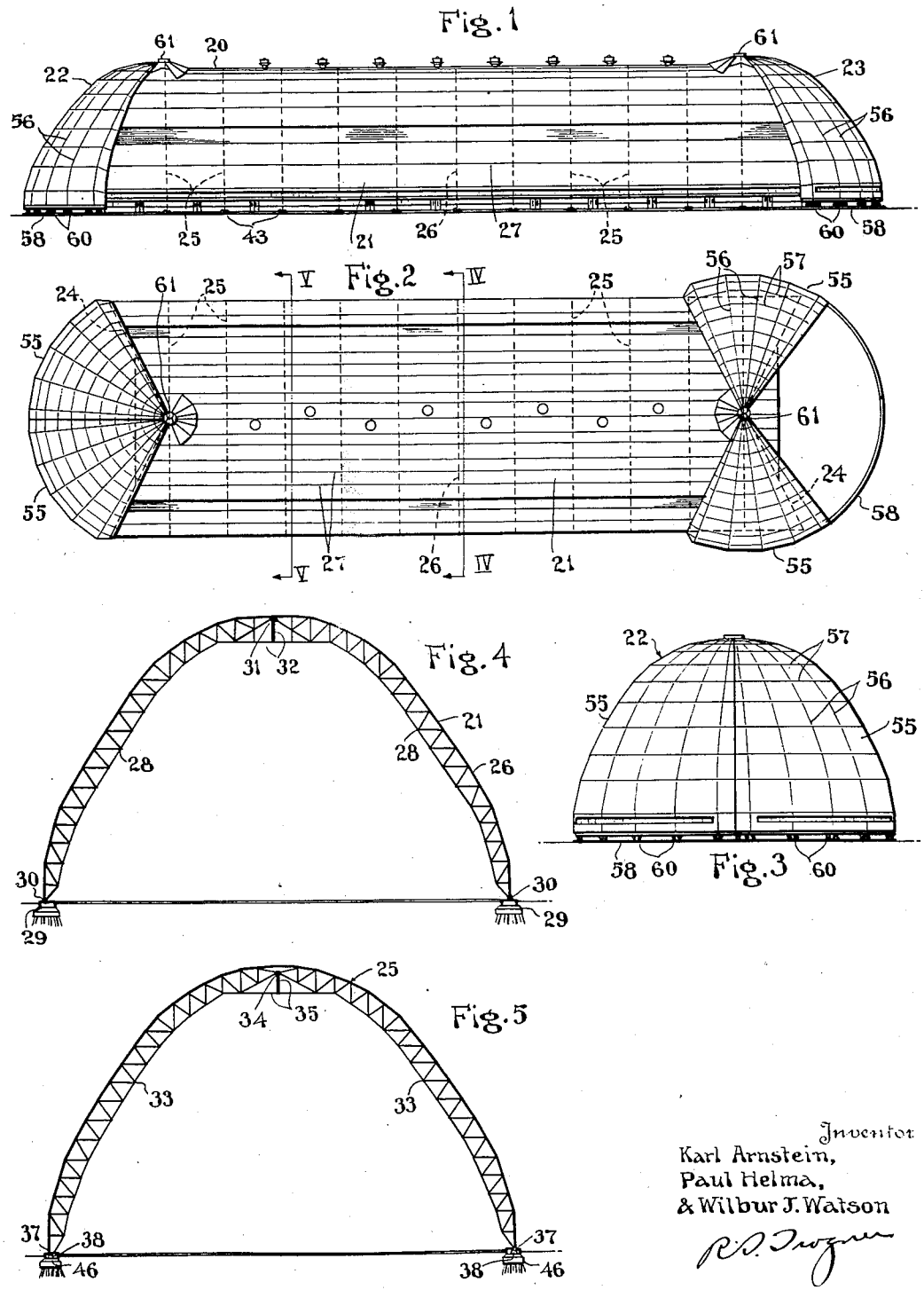
Inventor
Karl Arnstein,
Paul Helma,
& Wilbur J. Watson
Attorney

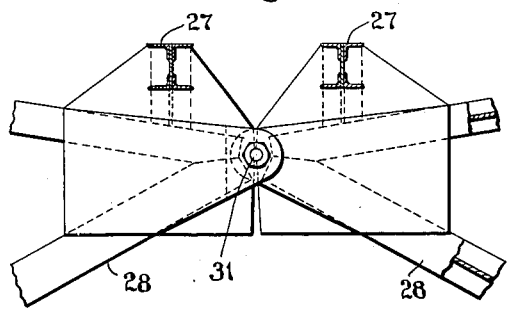
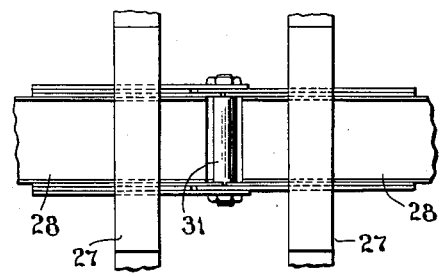
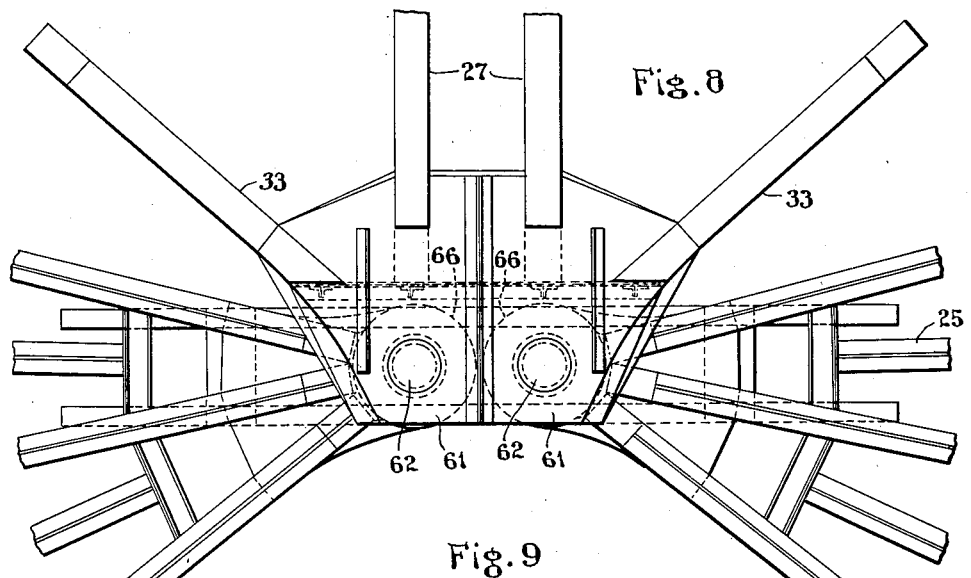
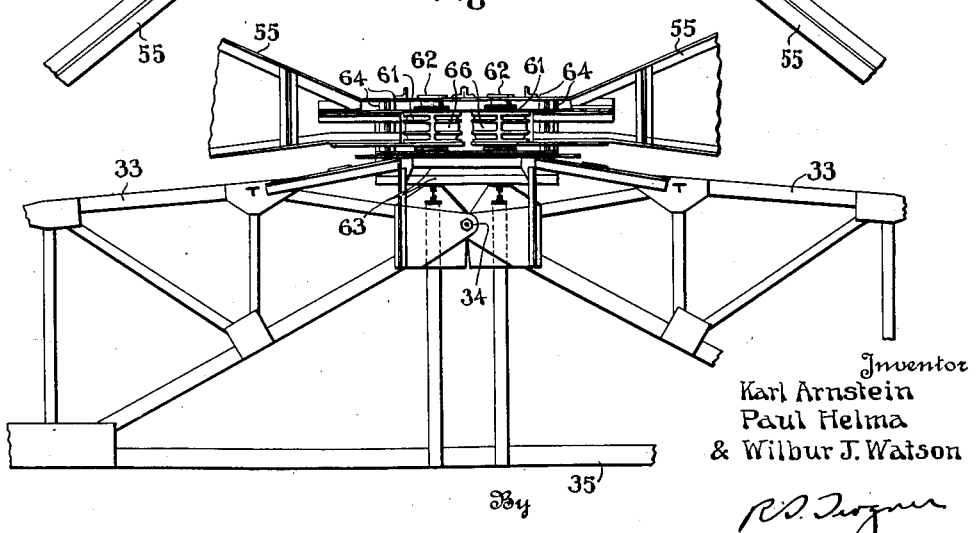

Jan. 12, 1932.   K. ARNSTEIN ET AL   1,841,321
AIRCRAFT HANGAR AND METHOD OF BUILDING IT
Filed March 28, 1929   3 Sheets-Sheet 3
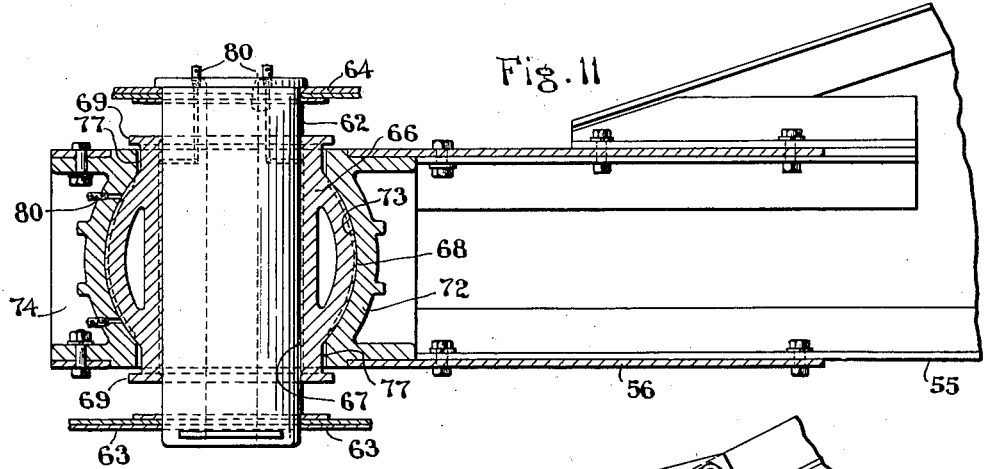
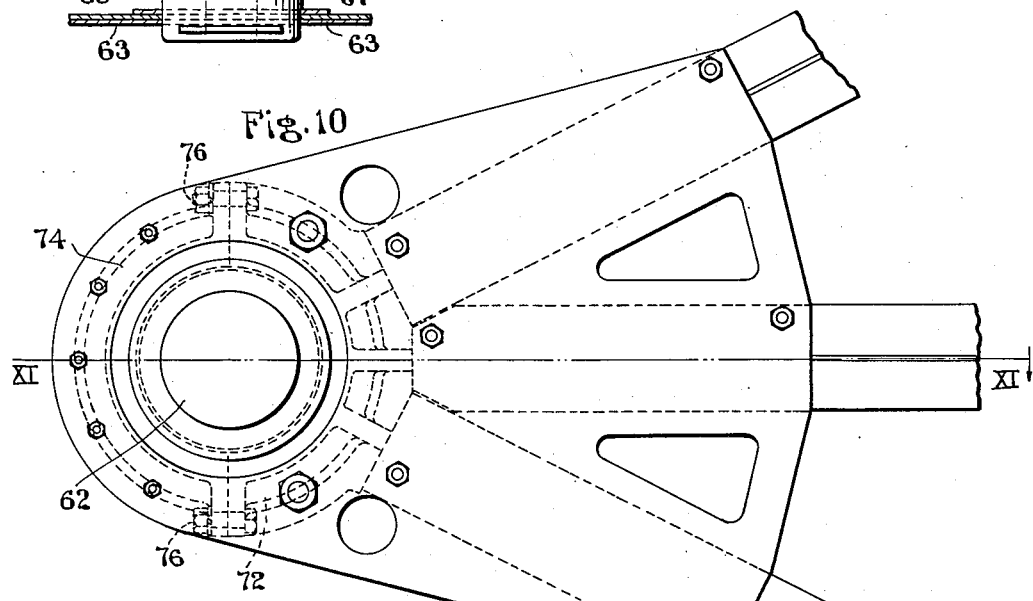
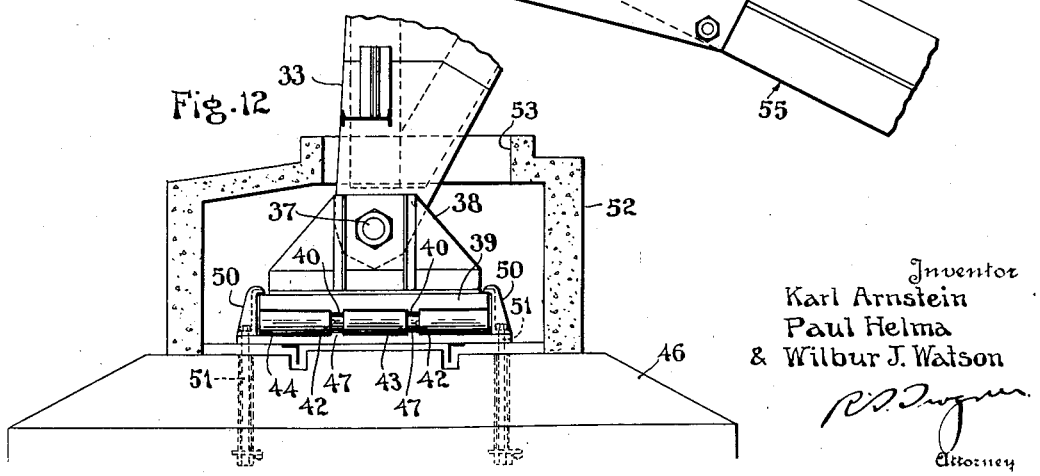
Inventor
Karl Arnstein
Paul Helma
& Wilbur J. Watson
Attorney Patented Jan. 12, 1932

1,841,321

UNITED STATES PATENT OFFICE

KARL ARNSTEIN AND PAUL HELMA, OF AKRON, AND WILBUR J. WATSON, OF CLEVELAND, OHIO, ASSIGNORS TO GOODYEAR-ZEPPELIN CORPORATION, OF AKRON, OHIO, A CORPORATION OF DELAWARE

AIRCRAFT HANGAR AND METHOD OF BUILDING IT

Application filed March 28, 1929. Serial No. 350,568.

This invention relates to hangars and it has particular relation to arched aircraft hangars and to a method of erecting the structural elements thereof.

One object of the invention is to provide a hangar composed of metallic framework that is so supported as to be free to contract and expand, in response to changes in temperature, without employing expansion joints.

Another object of the invention is to provide a hangar including doors having connections which afford proper coaction between the several elements of the structure and which permit relative movement between the door and the body portion of the hangar without regard to changes in position of the elements caused by contraction or expansion thereof.

Another object of the invention is to provide a method of erecting the structural elements of the hangar to form arched trusses.

For a better understanding of the invention, reference may now be had to the accompanying drawings, forming a part of the specification, of which:

Figure 1 is a side elevational view of a hangar constructed according to the invention;

Figure 2 is a plan view of the hangar;

Figure 3 is an end elevational view of the hangar illustrating the doors thereof in closed position;

Figure 4 is a cross-sectional view, on a larger scale, taken substantially along the line IV—IV of Figure 2;

Figure 5 is a cross-sectional view taken substantially along the line V—V of Figure 2;

Figure 6 is a fragmentary elevational view of a pivotal connection between adjacent trusses at the upper portion of the hangar;

Figure 7 is a fragmentary plan view of the construction shown by Figure 6;

Figure 8 is a fragmentary plan view of connecting elements between the hangar doors and the main shell of the hangar;

Figure 9 is a fragmentary elevational view of the construction shown by Figure 8;

Figure 10 is a plan view, on a larger scale, showing in detail one of the door connections;

Figure 11 is a cross-sectional view taken substantially along the line XI—XI of Figure 10; and Figure 12 is a fragmentary elevational view of the lower supporting devices of one of the arched trusses of the hangar.

Referring to Figures 1, 2 and 3, a hangar 20 embodying the invention is composed of a shell-like structure 21 and doors 22 and 23. Trussed arches 24, 25 and 26 that are spaced longitudinally of the hangar define its shape and support longitudinal frame members 27 extending from one end of the structure to the other.

The central arch 26 is composed of a pair of symmetrical trusses 28 which are anchored to foundations 29, although pivotal connections 30 are included between the lower ends of the trusses 28 and the foundations. Also, the upper portions of these trusses are provided with pivotal connections 31, which serve to facilitate the erection of the trusses. In the final assembly of the hangar, structural elements 32 are rigidly secured adjacent the upper portions of the trusses for the purpose of forming a unitary rigid arch.

Each of the arches 24 and 25 is composed of a pair of trusses 33, the upper ends of which are provided with a pivotal bearing 34 and rigid connecting framework 35 corresponding in arrangement and construction to the bearing 31 and structural elements 32, respectively. The lower ends of the trusses 33 rest upon pivotal bearings 37 that are similar to the bearings 30 and are supported upon carriages 38. As best shown by Figure 12, the lower portion of each carriage 38 includes a bearing plate 39 having guiding ribs or rails 40 thereon that are disposed within circumferential bearing grooves 42 formed in rollers 43. A suitable bearing plate 44 supports the rollers upon a foundation 46. Guiding rails or ribs 47 are also provided upon the upper surface of the plate 44 and are disposed within the groove 42 of the roller. Anchoring devices 50 are secured to the plate 46 by means of rods 51 embedded in the foundation and insure proper assembled relationship between the elements of the carriage and the rollers adjacent the ends of the latter. A housing 52 composed of cement or other suitable material surrounds the carriage and is provided with an opening 53 through which the lower ends of the trusses 33 extend. It will be observed that the axes of the bearings 30—37 and 31—34 are disposed longitudinally with respect to the hangar while the axes of the rollers 43 are disposed transversely thereof.

In erecting all of the trusses each arch is pivoted at three points including the two lower pivotal bearings 30 or 37 and the upper pivotal bearings 31 or 34. The arches are so designed as to have three points of pivotal bearings for the dead loads only, and they are then converted into arches having two pivotal bearings by providing the rigid framework 32 and 35 at the upper portions thereof. Since the arches 24 and 25 that are spaced on each side of the anchored arch 26 are mounted on rollers, they are free to move inwardly or outwardly toward or away from the center of the hangar in response to contraction or expansion of the metal framework caused by changes in temperature.

Each of the doors 22 and 23 is composed of two segments or leaves 55 that are constructed substantially in the form of segments of a sphere and decrease in width toward the upper portions thereof. Since the door segments are identical, the same numeral 55 is employed to indicate each of them. Each leaf is composed of trusses 56 and bracing girders 57. Circular tracks 58 are disposed adjacent the opposite ends of the shell-like structure 21 and are provided with cars or trucks 60 upon which the door leaves are mounted and operated.

The upper portion of each leaf 55 is supported upon a bearing 61, two of these bearings being arranged in contiguous relation (Figures 9–11) adjacent opposite ends of the hangar. Each of these bearings comprises a vertically disposed shaft 62 that is rigidly secured upon a support 63 forming a part of the upper structural elements of the trusses 33 of the end arches. Suitable bracing members 64 are secured to the upper portion of the shaft 62 and to the upper portion of the hangar super-structure for maintaining the shaft in proper vertical position. A sleeve 66 having an inner cylindrical surface 67 is fitted slidably upon each shaft 62, and is provided intermediate its ends with an outer spherical surface 68 and with end flanges 69. The upper portion of each door leaf is so constructed as to form a socket 72 having an inner spherical surface 73 corresponding in size to and fitting about the spherical surface 68 of the sleeve 66. A portion 74 of the socket is segmental and removable in order to receive the sleeve 66 and is secured in operative relation by means of conventional bolts 76. Sufficient space, as indicated at 77, adjacent the spherical surfaces 68 and 73, is provided to insure free universal movement between the elements 66 and 72. Universal movement between the door leaves 55 and the main structure of the hangar is thus effected, and at the same time the sleeve 66 is adapted to move vertically upon the shaft 62. Also, this connection provides the sole connection between the door leaves 55 and the main shell-like structure 21. Suitable lubricating means 80 are provided in the shaft 62 and in the socket 72.

From the foregoing description it will be apparent that a hangar can be constructed in such proportions as to house extremely large airships, and that the doors are so connected to the hanger that they can be opened or closed by operating supporting trucks along tracks regardless of whether or not the metallic trusses have contracted or expanded within all limits of atmospheric changes to which the hangar may be subjected.

Although we have illustrated only one form which the invention may assume, and have described that form in detail, it will be apparent to those skilled in the art that the invention is not so limited, but that various modifications may be made therein without departing from the spirit of the invention or from the scope of the appended claims.

What we claim is:

1. A hangar comprising a substantially rigid shell-like structure, an anchoring means for the shell, and supporting means spaced from the anchoring means, said supporting means having relatively movable connections to the shell-like structure to compensate for contraction and expansion of the structure toward and away from the anchoring means.

2. A hangar comprising a substantially rigid shell-like structure, anchoring means immovably supporting a portion of each side of the structure, and means movably supporting said structure at locations spaced from the anchoring means to compensate for contraction and expansion of the structure.

3. A hangar comprising a substantially rigid shell-like structure, anchoring means immovably supporting a portion of the structure spaced from the opposite extremities thereof, and means movably supporting portions of the structure located away from the anchoring means toward said extremities to provide substantially unobstructed contraction and expansion of the structure toward and away from the anchoring means.

4. A hangar comprising a substantially rigid shell-like structure, anchoring means immovably supporting a central portion of each side of the structure, and rollers supporting the remaining portions of the hangar to provide for free contraction and expansion of the structure in opposite directions toward and away from the anchoring means.

5. A hangar comprising a substantially rigid shell-like structure, anchoring means immovably supporting a portion of the structure spaced from the opposite extremities thereof, means movably supporting portions of the structure located away from the anchoring means toward said extremities for providing substantially unobstructed contraction and expansion of the structure toward and away from the anchoring means, and a pivotal connection included in the means movably supporting portions of the structure.

6. A hangar comprising a substantially rigid shell-like structure, a door, an arcuate track for movably supporting the door adjacent the structure, and a universal joint connecting together the upper portions of the door and the structure, the lower portions of the structure and door being free from each other.

7. A hangar comprising a substantially rigid shell-like structure having a movable portion, a door, means for movably supporting the lower portion of the door, and a pivotal connection supporting the upper portion of the door upon the shell-like structure, said pivotal connection including a universal joint and a slidable connection to compensate for movement of the movable portion.

8. A hangar comprising a substantially rigid shell-like structure, a door, means for movably supporting the lower portion of the door, and a universal joint supporting the upper portion of the door upon the shell-like structure, said universal joint being vertically slidable upon the shell-like structure.

9. A hangar comprising a substantially rigid shell-like structure, anchoring means immovably supporting a portion of the structure spaced from the opposite extremities thereof, means movably supporting portions of the structure located away from the anchoring means toward said extremities for providing substantially unobstructed contraction and expansion of the structure toward and away from the anchoring means, a door at one extremity of the structure, a universal hinge connecting the upper portion of the door to the upper portion of the structure, and means movably supporting the lower portion of the door for opening and closing the latter.

10. A shell-like hangar comprising a trussed arch, said arch including two trusses having lower pivotal supports and a pivotal connection between the trusses at the upper portion of the arch, and structural elements rigidly connecting the upper portions of the trusses in conjunction with the pivotal connection.

11. A shell-like hangar comprising a plurality of trusses constituting arches, means for connecting the arches, supporting means for each leg of a plurality of the arches, said means including a pivotal connection and a rolling connection, anchoring means for supporting one of the arches, said rolling connection providing for relative movement between the anchored arch and the other arches.

12. A method of building a shell-like structure which comprises pivotally supporting a pair of trusses at their lower ends to form an arch, pivotally connecting the upper extremities of the trusses, and thereafter rigidly connecting the upper portions of the trusses in conjunction with the pivotal connection.

13. A shell-like hangar for airships comprising a plurality of trusses constituting arches, means for connecting the arches, a support for each leg of a plurality of the arches, a pivotal connection between each support and the arch supported thereby, said connection providing a pivotal movement substantially in the median plane of the arch, rolling devices carrying each support, the direction of rolling being substantially transversely of the median plane of the arch, and stationary anchoring connections for supporting one of the arches, said rolling devices providing for relative movement between the anchored arch and the other arches.

In witness whereof, we have hereunto signed our names.

Signed at Akron, in the county of Summit and State of Ohio, this 25th day of March, 1929.

KARL ARNSTEIN.
PAUL HELMA.
WILBUR J. WATSON.